O. SCHLAUPITZ.
FEEDING AND EXTRACTING APPARATUS FOR ROTARY HEARTH OVENS.
APPLICATION FILED MAR. 22, 1920.

1,372,781. Patented Mar. 29, 1921.
7 SHEETS—SHEET 2.

O. SCHLAUPITZ.
FEEDING AND EXTRACTING APPARATUS FOR ROTARY HEARTH OVENS.
APPLICATION FILED MAR. 22, 1920.

1,372,781.

Patented Mar. 29, 1921.

UNITED STATES PATENT OFFICE.

OSWALD SCHLAUPITZ, OF CANTON, OHIO, ASSIGNOR TO THE TIMKEN ROLLER BEARING COMPANY, OF CANTON, OHIO, A CORPORATION OF OHIO.

FEEDING AND EXTRACTING APPARATUS FOR ROTARY-HEARTH OVENS.

1,372,781.  Specification of Letters Patent.  Patented Mar. 29, 1921.

Application filed March 22, 1920. Serial No. 367,690.

*To all whom it may concern:*

Be it known that I, OSWALD SCHLAUPITZ, a citizen of the United States, and a resident of the city of Canton, in the county of Stark and State of Ohio, have invented a new and useful Improvement in Feeding and Extracting Apparatus for Rotary-Hearth Ovens, of which the following is a specification.

My invention relates to rotary hearth furnaces of the kind used for heating metal articles preparatory to quenching them. The principal object of the present invention is to provide a device for automatically feeding the work onto the hearth and for automatically removing the work therefrom; and to adapt such device for connection to the driving mechanism of the furnace. Another object is to provide means for regulating the rate at which the work is fed onto the hearth and removed therefrom. Another object is to provide means for adjusting the feeding and extracting means to enable them to handle articles of different sizes. The invention consists in the combinations and arrangements of parts hereinafter described and claimed.

In the accompanying drawings wherein like symbols refer to like parts wherever they occur.

Figure 1:
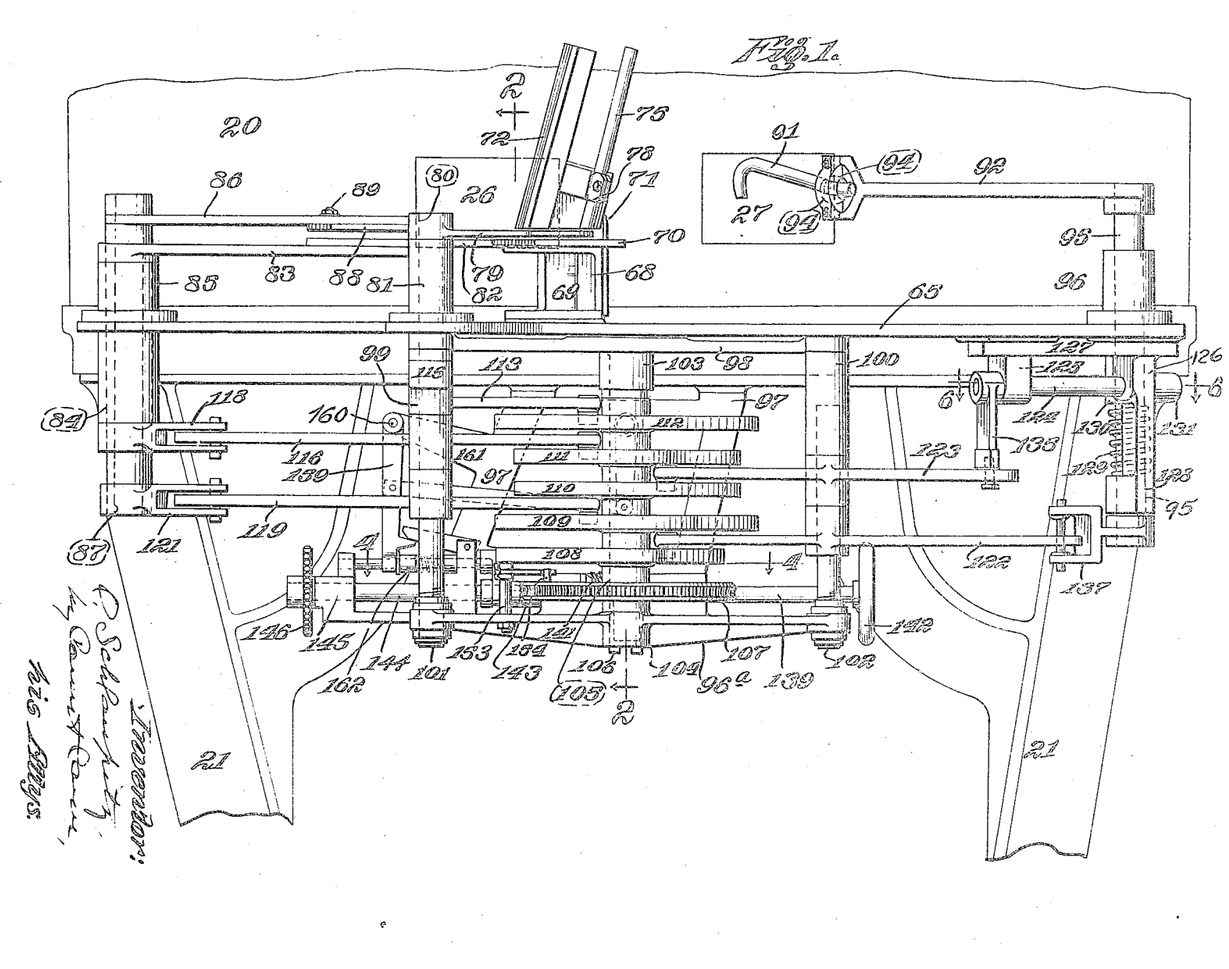
Figure 1 is a front elevation of the lower portion of a rotary hearth furnace provided with an automatic feeding and extracting device embodying my invention.
Figure 2:
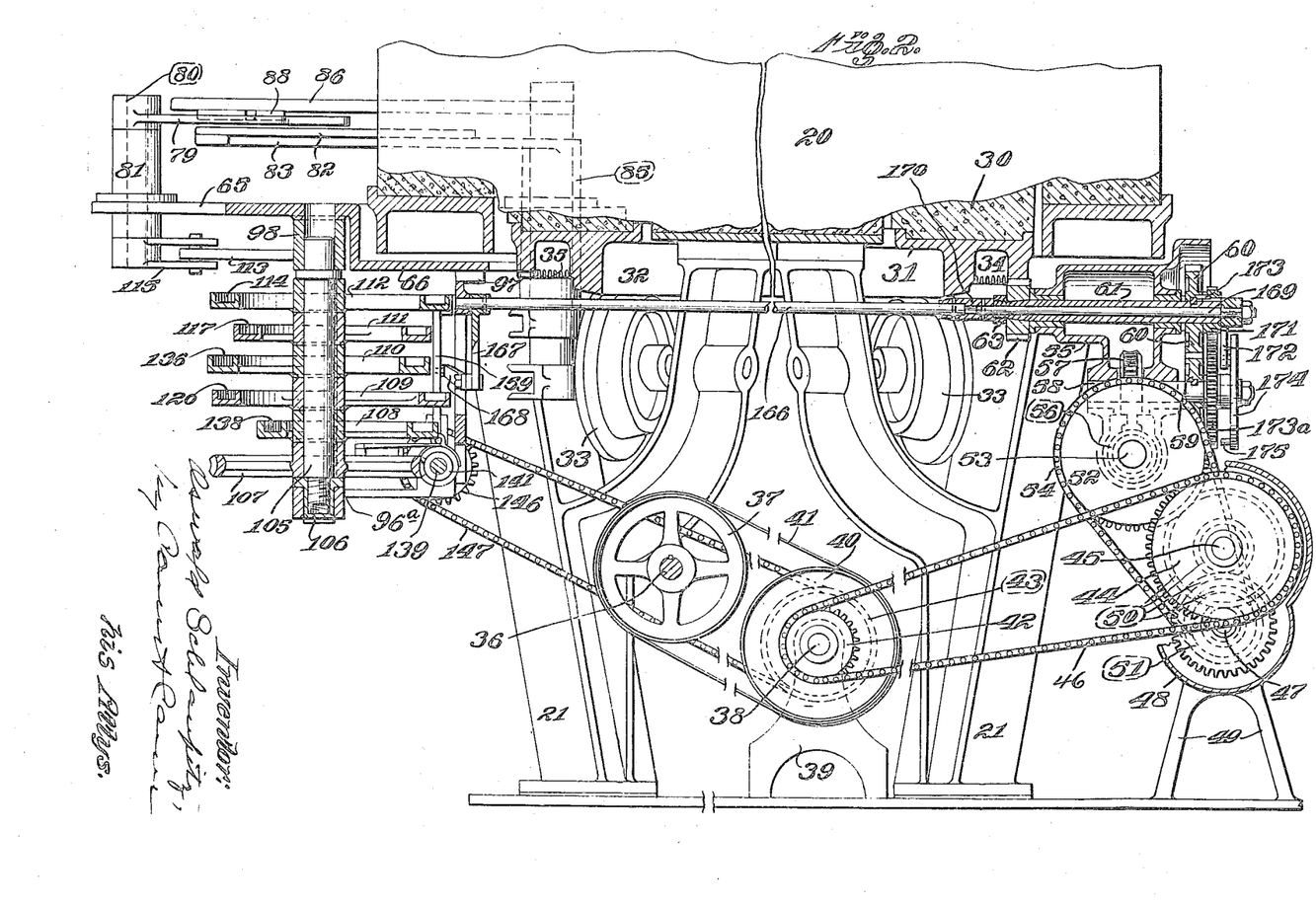
Fig. 2 is a central vertical section taken on the line 2—2 in Fig. 1, the upper portion of the furnace being shown in elevation.
Figure 3:
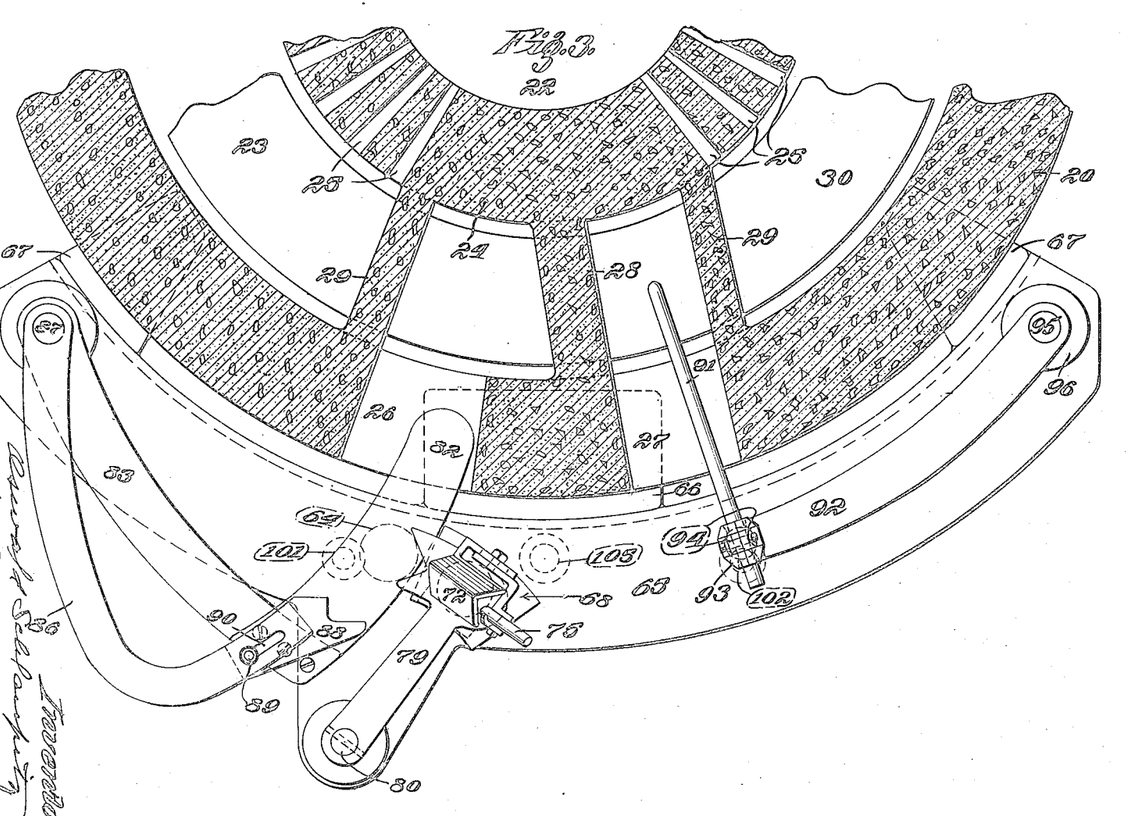
Fig. 3 is a plan view of the feeding and extracting device, the furnace being shown in horizontal section to disclose the heating chamber and the receiving and outlet openings thereof.
Figures 4, 5:
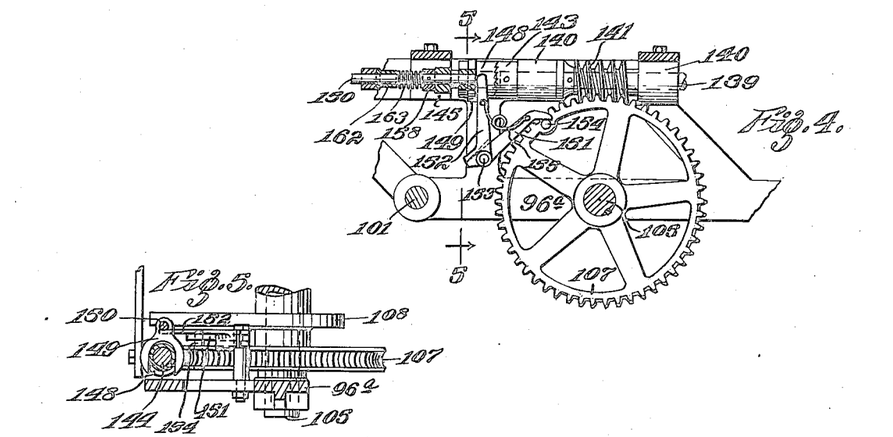
Fig. 4 is a fragmentary horizontal section taken through the cam shaft on the line 4—4 in Fig. 1, the section being taken just above the worm and worm gear for driving the cam shaft and showing the clutch for connecting the worm shaft to the clutch driving shaft, the stopping lever and the clutch knockout lever for operating the clutch being also shown.
Fig. 5 is a vertical section through the clutch driving shaft and the clutch shifter rod, the section being taken on the line 5—5 in Fig. 4.
Figure 6:
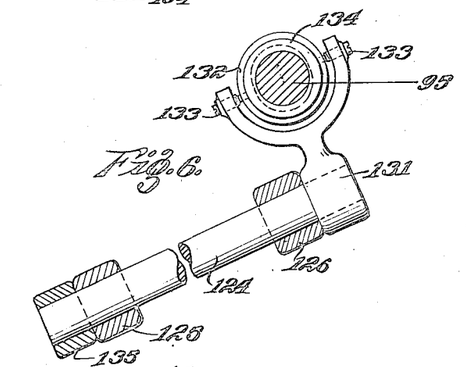
Fig. 6 is a detailed horizontal section on the line 6—6 in Fig. 1, the section being taken through the hanger plate bearings in which the lifter shaft is journaled, the lifter fork being shown at one end of the lifter shaft and in engagement with the extractor shaft.
Figure 7:
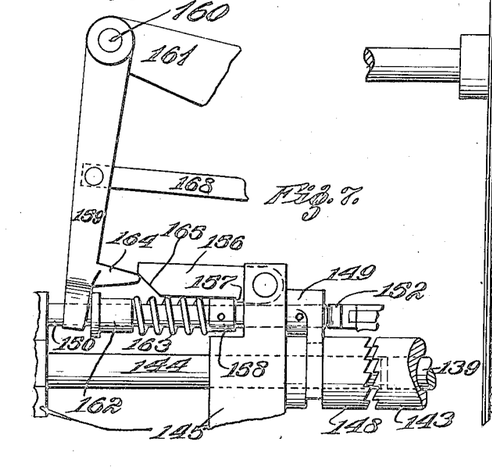
Fig. 7 is a fragmentary detailed view of the latch for locking the clutch shifter rod.
Figure 8:
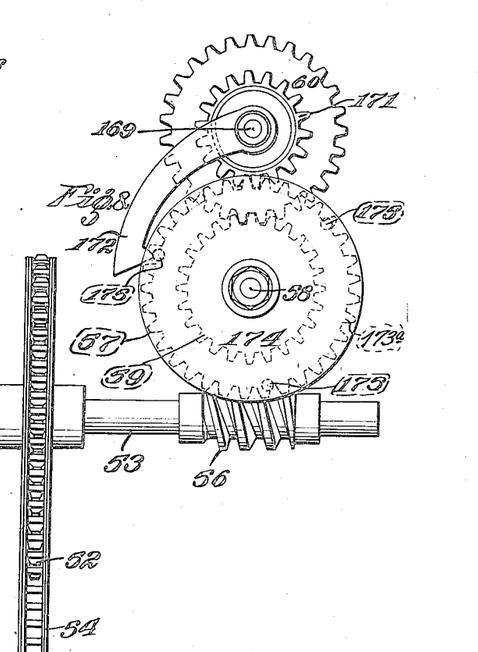
Fig. 8 is a detailed view of the worm and worm gear for driving the hearth ring, the removable starting disk, the starting lever, the removable gears at the end of the short starting rod and at the end of the worm gear shaft being also shown.
Figure 9:
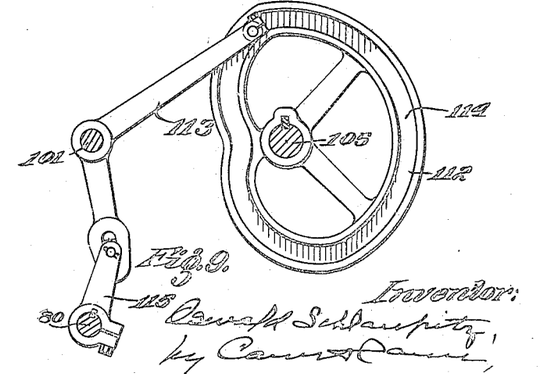
Fig. 9 is a horizontal section through the cam shaft, cam lever shaft and loader shaft, showing the cam lever which transmits motion from the loading cam to the loader shaft.
Figure 10:
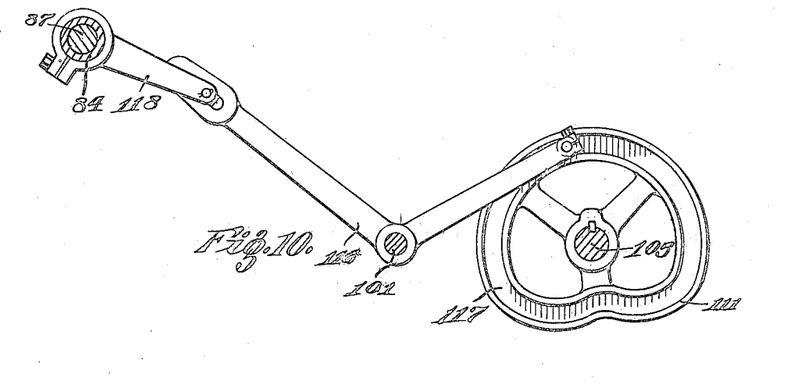
Figs. 10, 11, 12 and 13 are views similar to Fig. 9, showing the carrier cam, stripper cam, extractor cam and lifter cam and the respective cam levers which transmit motion to the loading and extracting devices.
Figure 11:
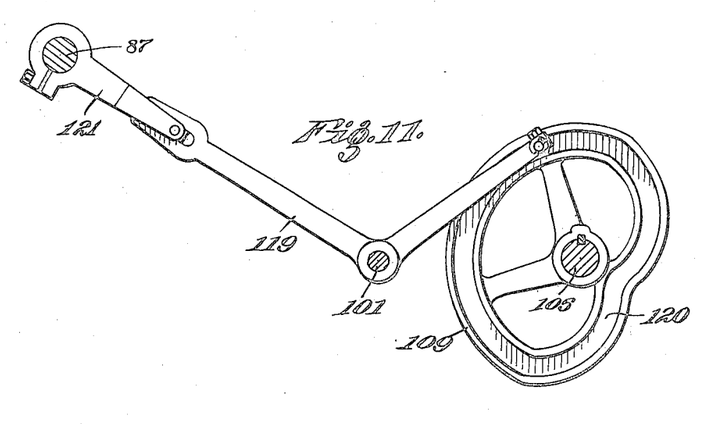
Figure 12:
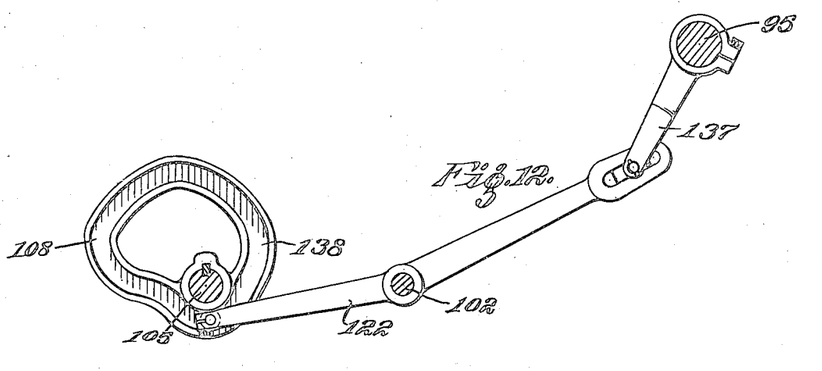
Figure 13:
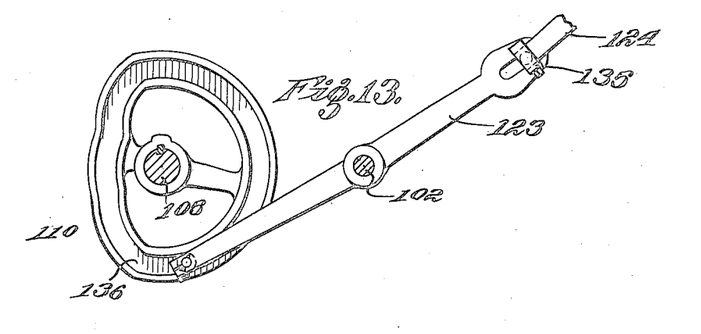
Figure 14:
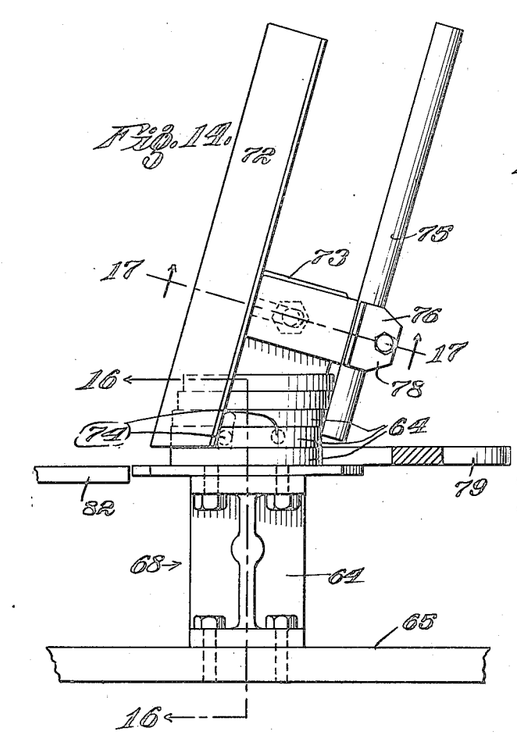
Fig. 14 is an enlarged side elevation of the magazine.
Figure 15:
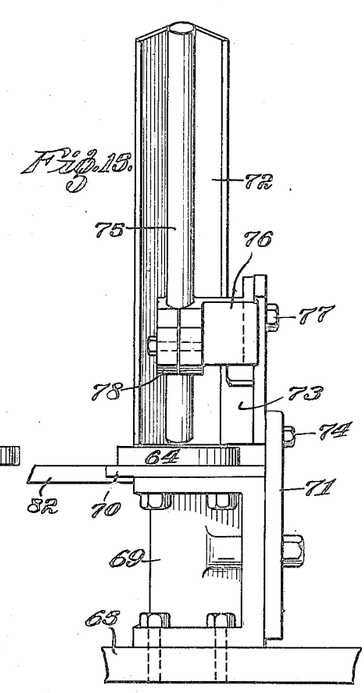
Fig. 15 is an end view of the same.
Figure 16:
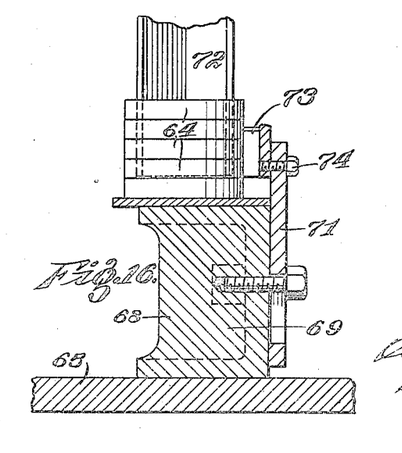
Fig. 16 is a vertical section taken through the lower portion of the magazine, the section being taken on the line 16—16 in Fig. 14.
Figure 17:
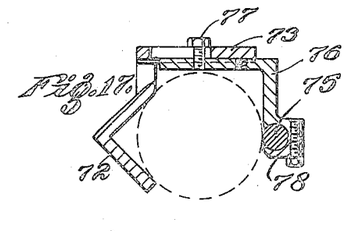
Fig. 17 is a horizontal section taken through the magazine on the line 17—17 in Fig. 14.

The rotary hearth furnace shown in Figs. 1 to 3 of the drawings comprises a cylindrical body portion 20 made preferably of fire brick and supported on a suitable number of standards 21. The furnace has a central circular fire chamber 22 surrounded by an annular heating chamber or oven 23 which is spaced therefrom by a circular wall 24. Communication between the fire chamber and the oven is established by means of a series of openings 25 in the wall 24. Extending radially across the oven, but at a distance above the bottom or hearth thereof, are two walls 29 located at the front portion of the construction and spaced far enough apart to provide space for a feed opening 26 and a delivery opening 27 in the outer wall of the furnace. Between said openings is a third radial wall 28 which clears the hearth but approaches it close enough to hold back any articles thereon.

The hearth bricks 30 are supported on a rotatable hearth ring 31. This ring has an inner annular flange 32 projecting downwardly therefrom which rests on rollers 33 that are journaled in the standards 21 and thus constitute rolling supports for the annular hearth ring 31. The hearth ring has a downwardly projecting flange 34 at its outer edge whose lower edge is provided with gear teeth 35 after a manner of a gear ring.

The hearth ring is driven from a line shaft 36 having a driving pulley 37 fixed thereto. Extending parallel with the line shaft is a countershaft 38 which is journaled in shaft hangers 39. Fixed to the countershaft is a pulley 40 which is driven from the driving pulley 37 on the line shaft 36 by means of a belt 41. The countershaft 38 is provided with a loose pulley (not shown) arranged along the side of the fast pulleys to support the belt when the same is thrown off the fast pulleys, by means of a suitable belt shifter (not shown), to disconnect the line shaft from the countershaft.

The counter shaft 38 is provided at its opposite ends with driving sprocket wheels 42 and 43. The sprocket wheel 42 is connected to a driven sprocket wheel 44 on the main shaft 45 of a speed change mechanism by means of a sprocket chain 46. The change speed mechanism can be of any desired type and is provided with a countershaft 47. This countershaft 47, together with the main shaft 45, is journaled in a gear case 48 supported on suitable standards 49. The main shaft and the countershaft are provided with the usual change speed gears 50 for obtaining different speed ratios. A driving sprocket 51 is secured to the end of the countershaft opposite from the end of the main shaft to which the sprocket wheel 44 is secured, and is connected to a driven sprocket 52, which is fixed to one end of a worm shaft 53, by means of a sprocket chain 54.

This worm shaft 53 is journaled in a worm gear case 55 secured to the under side of the furnace and has a worm 56 thereon which meshes with the worm gear 57 fixed to a worm gear shaft 58. This worm gear shaft is arranged at right angles to the worm shaft and is also journaled in the worm gear case 55. The worm gear shaft projects rearwardly beyond the worm gear case and has a pinion gear 59 keyed thereon. This pinion 59 meshes with a larger gear 60 which is keyed on the rear end portion of a tubular pinion shaft 61. This shaft is journaled in bearings in the worm gear case above the worm gear shaft and is arranged parallel therewith. The inner end of the tubular pinion shaft is tapered and has a pinion gear 62 keyed thereon which meshes with the annular gear 35 formed on the under side of the hearth ring 31. A nut 63 is threaded on the inner end of the pinion shaft to hold the pinion 62 thereon.

The furnace is preferably used for heat treating cups or cones for roller bearings. These members are in the form of short cylindrical metal tubes or rings 64. The mechanism for feeding these articles into the furnace through the receiving opening 26 and the mechanism for removing these articles from the outlet opening 27, after the articles have been carried around to this opening, is supported on an arcuate frame or supporting plate 65. This plate is curved to conform to the curvature of the furnace and is located below the receiving and outlet openings thereof and extends for a considerable distance on opposite sides of these openings. The supporting plate has a downwardly offset flange portion 66 at its middle and similar flange portions 67 at each end, all of which project inwardly beneath the brick work of the furnace and are secured thereto.

Mounted on the supporting plate adjacent to the receiving opening of the furnace is a magazine 68 in which the articles to be heat treated are stored or held in reserve. This magazine comprises a base member 69 mounted on the upper surface of the supporting member and is preferably held in position thereon by means of bolts. The top of the magazine base 69 is substantially flush with the bottom of the receiving opening of the furnace and has a base plate 70 rigidly secured thereto. The magazine is supported from the magazine base by means of a plate 71. This plate is secured to the back face of the magazine base, with its upper portion projecting above the upper surface of the same. This plate is secured to the magazine by means of a cap screw which extends through a vertical slot in the plate and is threaded into the back of the magazine base. This permits the back plate to be adjusted vertically, thus permitting the magazine to be raised or lowered as is desired. The magazine proper comprises a bar 72 of V-shape cross-section which extends upwardly from the front portion of the base member and is inclined slightly from the vertical. The lower portion of the bar 72 has an integral flange portion 73 which extends rearwardly from the outer margin of the inner flange of the bar and forms means for securing the magazine bar to the back plate 71 of the magazine base 69. The magazine bar 72 is secured to the back plate of the base member by means of a pair of cap screws 74. One of these screws passes through the lower flange portion of the magazine bar and is threaded into the back plate and the other screw extends through an arcuate slot formed in the back plate and is also threaded into the back plate. This passing of the last mentioned screw through the slot in the back plate permits the magazine to pivot on the first mentioned screw, thereby permitting the inclination of the magazine to be varied. The magazine is also provided with a suitable brace in the form of a rod 75 which is secured to the lower flange portion 73 of the magazine bar, in line with the apex of the angle formed by the V-shaped magazine guide, by means of a supporting bracket 76. This bracket is secured to the inner face of the flange portion 73 of the magazine guide by means of a cap screw 77. This cap screw extends through a horizontal slot in the flange portion 73 of the magazine bar and is threaded into the supporting bracket 76, thus permitting the brace rod to be moved toward or away from the magazine bar to accommodate cups of different diameters. The brace rod is secured to the supporting bracket by means of a clamp 78 which is secured to the bracket by means of a cap screw and is provided with an overhanging portion grooved to embrace the brace rod, thus firmly clamping the brace rod to the supporting bracket. The lower edge of the magazine guide bar is spaced from the base plate of the magazine a sufficient distance to enable the lowermost cup in the stack to be slid out from beneath the remaining cups. This space, of course, depends upon the widths of the cups to be handled and can be varied by raising or lowering the back plate 71 which supports the magazine.

The lowermost cup is stripped from the bottom of the stack by means of a loading arm 79. The inner end of this loading arm is keyed to the upper portion of a vertical shaft 80 which is journaled in a bearing 81 projecting upwardly from the supporting plate 65. The loading arm, which is adapted to be swung in a horizontal plane in a manner hereinafter described, is provided at its outer end with an enlarged head portion whose front edge is provided with a V-shaped notch. The head portion of the loading arm works in the space between the upper surface of the magazine base plate and the underside of the V-shaped guide bar of the magazine. Thus, when the loading arm is moved to the left, as shown in Fig. 3, the V-shaped notch in the head portion of the loading arm forces the bottom cup out from beneath the stack of cups in the magazine onto the upper surface of a curved carrier plate 82.

This carrier plate has one end secured to the outer end of a curved arm 83 and its opposite end projects into the receiving opening of the furnace. The inner end of the carrier arm 83 is keyed to the upper end of an upright tubular shaft 84 so as to turn therewith. The curved plate 82, located at the outer end of the arm 83, is curved in an arc described from the center of the tubular shaft 84. The tubular carrier shaft 84 is mounted in a bearing 85 which projects upwardly from the supporting plate 65 and is rigidly secured to the upper surface thereof. After the cup has been deposited on the carrier plate 82 by the loading arm 79 and after the loading arm has been withdrawn from engagement with the cup, the tubular carrier shaft 84 is partially rotated, in a manner hereinafter described, to swing the carrier arm toward the furnace. This swinging movement of the carrier arm causes the carrier plate at the outer end thereof to move through the receiving opening of the furnace until its outer end reaches a position over the rotary hearth ring. The cup is then pushed off the end of the carrier plate by means of a curved stripper arm 86 and drops onto the rotary hearth ring.

This stripper arm is located above the carrier arm and has one end keyed or otherwise secured to the upper end portion of a vertical shaft 87. This stripper shaft 87 projects downwardly through the tubular carrier shaft 84 and is actuated in a manner hereinafter described. A stripper plate 88 is adjustably secured to the outer end of the stripper arm by means of a bolt 89 which extends upwardly through a hole in the stripper arm and projects through a slot 90 in the stripper plate. A nut is threaded on the upper end of the bolt for clamping the plate in its adjusted position on the end of the stripper arm. This arrangement permits the stripper plate to be adjusted to accommodate cups of different diameters. The outer edge of the stripper plate is provided with a V-shaped notch which prevents lateral movement of the cup after the same is engaged by the notch.

After being deposited on the rotary hearth of the furnace, the cups are carried around thereon to the outlet opening of the furnace where they are removed through this opening by means of an extracting rod 91 and then quenched in a suitable quenching liquid. This extractor rod extends into the outlet opening of the furnace and has a downwardly extending hook formed on its outer end. The opposite end of the extractor rod is secured to the outer end of a curved arm 92 by means of a cap 93 which is fastened, by means of cap screws, to an enlarged head portion formed on the outer end of the extractor arm. The adjacent faces of the enlarged head portion of the extractor arm and of the cap 93 are provided with registering semi-spherical concavities in which are fitted counterpart half spheres 94. The adjacent faces of the half spheres are grooved to embrace the cylindrical surface of the extractor rod 91. The registering concavities in the cap and in the head portion of the extractor arm are provided with flat portions adapted to grip the surfaces of the half spheres seated therein when the cap is clamped in position on the end of the extractor arm. The opposite walls of the cap and of the enlarged head portion of the extractor arm are provided with registering semi-circular notches through which the extractor rod passes, their radii being greater than the radius of the extractor rod, thus leaving a slight clearance between the notches and the extractor rod. With this form of joint, when the cap is loosened, a slight vertical swinging movement of the extractor rod at its free outer end is permitted, thus permitting the extractor rod to be adjusted for cups of different heights. The extractor rod can also be adjusted for cups of different diameters by sliding the same backward or forward in the half spheres 94. Lateral movement of the extractor arm is prevented by means of a pin which projects upwardly from the bottom of the concavity in the head of the extractor arm and extends into a slot formed in the half sphere located therein. This slot extends parallel with the longitudinal axis of the extractor rod.

The inner end of the extractor arm 92 is keyed to a vertically reciprocatable upright shaft 95 which is journaled in a bearing 96 secured to the top of the supporting plate 65 and which extends downwardly through said plate. When a cup arrives opposite the outlet opening 27, the extractor shaft 95, which is normally held in raised position, is partially rotated, in a manner hereinafter described, and causes the extractor rod to swing through the outlet opening until its downwardly hooked portion reaches a position directly over the cup. The extractor shaft is then lowered, in a manner hereinafter described, and causes the hook at the outer end of the extractor rod to enter the central opening in the cup. The shaft is then rotated in the opposite direction, causing the engaged cup to be withdrawn from the furnace through the outlet opening 27 thereof. This movement continues until the cup is drawn beyond the outer edge of the supporting plate where it drops off the hook into a receptacle (not shown) containing a suitable quenching liquid.

The mechanism for actuating the loading arm, the carrier arm, the stripper arm and the extractor arm is mounted below the supporting plate 65 on a horizontally disposed open frame 96ª which is suspended from the supporting plate by means of a vertically disposed open frame 97. The upper portion of the vertically disposed frame 97 is secured to the under side of the downwardly offset flange 66 which projects inwardly from the middle of the supporting plate beneath the furnace and its lower portion is secured to the rear edge of the horizontally disposed frame 96ª. The front end of the horizontal frame 96ª is supported from the under side of the supporting plate 65 by means of a hanger plate 98 which is bolted to the underside of the supporting plate. The opposite ends of this plate are provided with downwardly extending bosses 99 and 100 which are disposed in vertical alinement with similar bosses formed on the upper surface of the front portion of the horizontal frame 96ª. The upper ends of vertical cam lever rods 101 and 102 are pressed firmly into holes formed in the downwardly projecting bosses 99 and 100 of the lever rod hanger plate 98 and their lower threaded ends extend through the bosses in the horizontal frame 96ª and are clamped thereto above and below by means of nuts. The hanger plate 98 and the horizontal supporting frame 96ª are also provided with alined bearings 103 and 104 located midway between the bosses which receive the cam lever rods.

The upper end of an upright cam shaft 105 is journaled in the bearing 103 in the hanger plate at its lower end and has a flanged cylindrical nut 106 threaded thereon which is journaled in the bearing 104 of the horizontal frame 96ª. The collar of the nut 106 rests on the upper surface of the bearing 104 of the horizontal frame 96ª and thus supports the cam shaft. The cam shaft has a worm gear 107 keyed on its lower end whose hub portion rests on the collar of the cylindrical nut 106. Keyed on the cam shaft and arranged one above the other. In the order named, are: the extractor cam 108, the stripper cam 109, the lifter cam 110, the carrier cam 111 and the loading cam 112.

The uppermost cam 112, the loading cam, communicates motion to the loader shaft 80 to swing the loading arm 79, keyed to the upper end thereof, by means of a bent cam lever 113 which is fulcrumed on the cam lever shaft 101. The long arm of the lever has a cam roller journaled on a pin clamped in a vertical bore in its outer end. This roller is on the underside of the lever and rides in a cam groove 114 formed in the upper surface of the loading cam 112. This cam groove extends concentrically around the cam for a distance and gradually approaches the center of the cam on opposite sides so as to intermittently actuate the cam lever at proper time intervals during each complete revolution of the cam. The short arm of the loading cam lever 113 is connected at its outer end to a lever 115 which is keyed on the lower end of the loader shaft 80. The outer end of the loader shaft lever 115 is bifurcated to receive the end of the short arm of the loading cam lever. These two levers have a slot and pin connection to allow for a slight difference of motion when the levers are swung in reverse arcs.

Motion is communicated to the carrier shaft 84 from the carrier cam 111 by means of a bent lever 116 which is fulcrumed on the cam lever rod 101. The short arm of this lever has a cam roller journaled on a pin clamped in its outer end. This cam roller rides in a cam groove 117 formed in the upper surface of the carrier cam. This cam groove extends concentrically around the cam for a portion of its length and has an eccentric portion which gradually approaches the center of the cam for swinging the carrier cam lever through the desired angle. The outer end of the long arm of the carrier lever is connected to a lever 118 which is keyed to the lower end of the tubular carrier shaft 84. This carrier shaft lever is located below the lower edge of the carrier shaft bearing 85 and prevents upward movement of the same therein. The outer end portion of this carrier shaft lever is bifurcated to receive the outer end of the long arm of the carrier cam lever and both levers are connected by a slot and pin connection.

A cam lever 119 for rocking the stripper shaft 87 to swing the stripper arm 86 is also fulcrumed on the cam lever rod 101. This stripper cam lever is similar to the carrier cam lever, being of the same length, and its short arm has a cam roller journaled on a pin in its outer end. This cam roller travels in the cam groove 120 formed in the upper surface of the stripper cam 109. This cam groove has a concentric portion for holding the stripper cam lever in inoperative position and it is also provided with an eccentric portion curved in toward the center of the cam for actuating the stripper cam lever at proper time intervals. The outer end of the stripper cam lever has a slot and pin connection with the bifurcated outer end portion of a lever 121 keyed on the lower end of the stripper shaft 87 to allow for a slight difference of motion between the levers.

Motion for rocking the extractor shaft 95 to swing the extractor arm 92, which causes the extractor rod 91 to enter and be withdrawn from the furnace through the outlet opening thereof, is transmitted from the extractor cam 108 to the lifter and extractor shaft 95 by means of a bent extractor cam lever 122. This extractor cam lever is fulcrumed on the cam lever rod 102 just below the depending boss 100 of the hanger plate 98.

The outer end of the outer arm of the extractor cam lever 122 has a slot and pin connection with a lever 137 which is keyed to the lower end of the extractor shaft. The end of the inner arm of the extractor cam lever is provided with a cam roller which travels in a cam groove 138 formed in the upper surface of the extractor cam 108. This cam groove has concentric inner and outer portions which are connected by inwardly curved portions. The inwardly curved portions of the cam groove serve to rock the extractor cam lever in opposite directions which lever, in turn, rocks the extractor shaft in opposite directions. The concentric portions of the cam grooves cause the extractor shaft to remain stationary for a short period of time at the end of each partial rotation thereof.

Motion for lifting the extractor rod 91 above the tops of the cups resting on the hearth ring is transmitted from the lifter cam 110 to the mechanism for lifting said shaft by means of a bent lifting cam lever 123 which is fulcrumed on the cam lever rod 102 above the extractor cam lever 122. The mechanism for lifting the upright extractor shaft comprises a horizontal lifter shaft 124 which is journaled in bearings 125 and 126 formed on the underside of a lifter and extractor shaft bearing plate 127. This plate is rigidly secured to the underside of the supporting plate 65 adjacent to the extractor shaft bearing 96. The bearing 126 projecting from the under side of the bearing plate 127 has a downwardly extending portion in the form of a bearing 128 in which the lower end of the extractor shaft 95 is journaled. The extractor shaft has a coil spring 129 sleeved thereon for normally holding the same in raised position. The lower end of this spring rests on the upper surface of the bearing 128 and its upper end bears against the under side of a collar 130 secured to the shaft and thus holds the same in raised position. The outer end of the lifter shaft 124 has a lifter fork 131 rigidly secured thereto whose fork portion braces a lifter collar 132 which is loosely sleeved on the extractor shaft. The forked arms of the lifter fork are provided with oppositely disposed pivot screws 133 which engage the lifter collar on opposite sides and thus pivotally secure the same. The central opening of the lifter collar is enlarged in a direction at right angles to its supporting pivots to permit slight tilting of the collar on the extractor shaft. The extractor shaft is provided with collars 134 arranged above and below the lifter collar and which are engaged by the lifter collar when the extractor shaft is raised or lowered.

The lifter shaft is connected to the outer arm of the lifter cam lever 123 by means of a lever 135 which is secured to the inner end of the lifter shaft. This lifter shaft lever projects downwardly and has a slide block journaled on a pin which projects from its lower end. This slide block fits in an elongated slot formed in the outer end of the lifter cam lever. The sides of this slide block, which engage the side walls of the slot in the cam lever, are slightly rounded to permit a slight rocking of the slide block when the lifter shaft is rocked. The inner arm of the lifter cam lever is provided at its end with a cam roller which rides in a cam groove 136 formed in the lifter cam 110. This cam groove is concentric with the cam shaft for a portion of its length which imparts no motion to the lifter cam lever and has an inwardly curved portion which draws the inner arm of the lever toward the axis of the cam. This action throws the outer arm of the lifter cam lever in the reverse direction toward the front of the machine. This movement of the cam lever, by reason of its connection with the lifter shaft lever, causes said lever to swing upwardly. This rocks the lifter shaft to the right and causes the lifter fork at the outer end thereof to swing upwardly and engage the upper collar 134 on the extractor shaft 95, thus lifting this shaft and the extractor rod 91 supported thereby.

A horizontally disposed worm shaft 139 is journaled in spaced bearings 140 which project from the upper side of the horizontally disposed open frame 96 at the rear thereof. This worm shaft has a worm 141 pinned thereon which is located between the spaced worm shaft bearings 140 and meshes with the worm gear 107 on the lower end of the cam shaft 105. One end of the worm shaft is provided with a hand wheel 142 for manually rotating the same. The opposite end of the worm shaft is provided with a clutch member 143 which is pinned thereon.

Extending from the clutch end of the worm shaft, in axial alinement therewith, is a horizontally disposed drive shaft 144. This drive shaft is journaled in spaced bearings 145 which project upwardly from the rear portion of the horizontal frame 96. This driving shaft is provided with a sprocket wheel 146 at its outer end which is driven from the sprocket wheel 43 on the constantly rotating line shaft 36 by means of a sprocket chain 147. The contiguous ends of the worm shaft 139 and the drive shaft 144 are adapted to be coupled and uncoupled by means of a clutch 148 which is slidably mounted on the inner end of the drive shaft. The adjacent faces of the two clutch members 143 and 148 are provided with clutch teeth adapted to fit into each other when the clutches are in gear. The sliding clutch 148 is thrown into and out of engagement with the clutch 143 on the inner end of the worm shaft by means of a shifter fork 149. This clutch shifter fork is pinned on the inner end of a shifter rod 150 which is slidably mounted in upwardly projecting portions of the spaced bearings 145 in which the clutch drive shaft 144 is journaled.

The drive shaft clutch is thrown out of engagement with the worm shaft clutch by means of a stopping lever 151 and a knockout lever 152. Both of these levers are pivoted on a pivot stud 153 which projects upwardly from the horizontal frame 96. The free end of the stopping lever overhangs the upper outer edge of the worm gear 107 and lies in the path of a pin 154, which projects upwardly from the upper edge of the worm gear, so as to be engaged thereby during each revolution of the worm gear. The free outer end of the knockout lever engages the clutch shifter fork. The stopping lever and the clutch knockout lever are yieldably connected by means of a wire spring 155. This wire spring not only yieldingly connects the two levers but also spreads them apart, thus holding the outer end of the stopping lever in the path of the pin on the worm gear wheel and also holding the outer end of the clutch knockout lever in engagement with the clutch shifter fork. With this arrangement, the pin on the worm gear engages the stopping lever during every revolution of the worm gear, causing the outer end of the clutch knockout lever to engage the clutch shifter fork and move the same. This fork pulls the sliding clutch 148 on the drive shaft out of engagement with the clutch 143 pinned to the worm gear shaft, thus permitting the drive shaft to rotate without transmitting its motion to the worm shaft.

The sliding clutch 148 is held in its uncoupled position by means of a latch lever 156. This latch lever is pivoted in an upwardly projecting portion of the innermost bearing 145 above the shifter rod 150. The latch is provided with a shoulder portion 157 which drops behind a collar 158. This collar is pinned on the shifter rod and, when engaged by the shouldered portion of the latch lever, prevents inward movement of the shifter rod. This latch is lifted and the shifter rod shifted, thus enabling the clutch driving shaft and the worm shaft to be coupled together, by means of a vertically disposed lever 159. The upper end of this clutch shifter lever is fulcrumed on a horizontal pivot stud 160 which projects from a lug 161 on the vertical frame member 97. The lower end of the clutch shifter lever is provided with a forked portion which straddles the shifter rod and engages a collar 162 loosely sleeved thereon. A coil spring 163 is sleeved on the shifter rod between the loose collar 162 and the fixed collar 158 thereon for holding the loose collar against the forked end portion of the shifter lever. The shifter lever is provided with a tapered lug or finger 164 adapted to engage the adjacent beveled outer end portion 165 of the latch lever.

The mechanism for actuating the clutch shifter lever 159, which throws in the clutch to start the loading and extracting devices, comprises a long rock rod 166. This rod is located beneath the center of the furnace and is arranged at right angles to the line shaft 36. The forward end of this starting rod is journaled in a bearing formed in the upper portion of the vertical frame 97. A downwardly extending lever arm 167 is secured to the front end portion of the long starting rod adjacent to its forward bearing. The lower end of this starting rod lever is connected to the middle portion of the clutch shifter lever 159 by means of a link 168. The rear end of the long starting rod 166 is connected to the forward end of a short starting rod 169 by means of a tubular coupling member 170. This short starting rod is journaled in the tubular pinion shaft 61 which is rotatably mounted in the worm gear case 55 supported on the under side of the furnace.

A detachable gear 171 is sleeved on the rear end portion of the tubular shaft 61 and is arranged between the gear 60 on the rear end of said shaft and a starting lever 172 on the rear end of the short starting rod 169. This gear 171 is forced to rotate with the adjacent gear 60 by means of pins 173 whose opposite ends project into alined holes formed in the adjacent faces of the gears 60 and 171. The rear end of this short starting rod projects beyond the gears 60 and 171 on the rear end portion of the pinion shaft and has a squared portion adapted to fit into a square hole formed in the hub portion of the downwardly curved starting lever 172. A nut is threaded on the reduced end of the short starting rod to hold the starting lever thereon, which lever in turn holds the detachable gear 171 and the gear 60 on the end of the tubular shaft 61. The gear 171 meshes with a gear 173$^a$ rotatably mounted on the worm gear shaft 58 adjacent to the outer face of the gear 59 keyed thereon.

A detachable starting disk 174 is rotatably mounted on the end of the worm gear shaft and is connected to the gear 173$^a$ on the worm gear shaft so as to rotate therewith. This connection is formed by means of pins which extend into holes formed in the adjacent hub portions of the gear 173$^a$ and the starting disk 174. The detachable gear 173$^a$ and the starting disk 174 are held in place on the worm gear shaft by means of a nut which is threaded on the reduced end portion thereof. The starting disk and the gear 173$^a$ are spaced from each other by their projecting hub portions. The starting disk has a number of radially spaced pins 175 which project from the side thereof toward the gear 173$^a$. The lower end of the starting lever 172 extends downwardly between the adjacent faces of the starting disk and the gear 173$^a$ and has a beveled lower edge portion which lies in the path of the circular series of pins 175 on the starting disk.

With this arrangement, the turning of the gear 60 on the tubular pinion shaft 61 causes the detachable gear 171, which is pinned to the gear 60, to rotate with said gear. This gear 171 drives the gear 173$^a$, which is loosely mounted on the worm shaft, and this gear in turn rotates the removable starting disk pinned thereto. This rotating of the starting disk causes the pins thereon to engage the beveled end of the starting lever and swing the same upwardly. This action rocks the long and short starting rods 166 and 169 and causes the lever 167, fixed to the forward end of the long starting rod, to swing upwardly and draw the link 168 inwardly. This movement of the link swings the clutch shifter lever 159 inwardly and causes the beveled finger 164 thereof to engage the beveled outer end portion 165 of the latch 156, thus lifting the same and unlocking the shifter rod 150. Continued movement of the shifter lever 159 causes the forked end thereof to engage the loose collar 162 on the shifter rod and presses this collar against the spring 163. This spring is then forced against the collar 158 fixed to the shifter rod. This spring, after being compressed sufficiently, forces the shifter rod and the clutch shifter fork 149 thereon inwardly. This action throws the sliding clutch 148 into engagement with the clutch 143, thus coupling the drive shaft 144 to the worm shaft 139. This rotating of the worm shaft causes the worm thereon to rotate the worm gear 107 on the cam shaft 105 and all of the cams thereon.

Each time the clutch 148 is thrown in, by the action of the pins on the starting disk striking the starting lever, all of the cams on the cam shaft are rotated one complete revolution and communicate motion to the various working parts which operate in the following order.

The cup is removed from the magazine and deposited upon the carrier plate by the loader arm. The carrier plate is then swung through the receiving opening of the furnace to a position over the hearth ring. The stripper arm then pushes the cup off the carrier plate on to the hearth ring. The continuously rotating hearth ring carries the cup from the receiving opening of the furnace to the outlet opening thereof. The various cams are so timed with respect to the hearth ring that, upon the arrival of the cup opposite the outlet opening, the extractor rod moves in through the outlet opening into a position with its hooked end portion over the cup. The extractor rod is then lowered, causing the hooked end thereof to enter the opening in the cup. The extractor rod is then withdrawn and draws the cup over the edge of the supporting plate where it is dropped into a receptacle containing the quenching liquid. The parts are all returned to their normal positions before the cams complete their rotation.

The various working parts of the device can be adjusted to handle cups of different sizes in the manner hereinbefore described. The speed with which the cups are fed into the furnace and removed therefrom depends on the speed of the hearth ring and is controlled by the detachable gears 171 and 173ª. These gears are furnished in sets of different sizes to obtain different speed ratios. This speed is further controlled by the use of separate starting disks having six, eight and ten holes for the starting pins. With a starting disk having six pin holes, an equal spacing for three or six pins can be obtained. With a starting disk having eight pin holes, an equal spacing for four or eight pins can be obtained. With a starting disk having ten pin holes, an equal spacing for five or ten pins can be obtained.

Obviously, the construction admits of considerable modification without departing from the invention. For instance, the feeding mechanism can be used independently of the extracting mechanism and the removal of the articles can be effected by any desired method.

What I claim is:

1. The combination, with an oven for heat treating metal articles, of article feeding mechanism therefor, means for intermittently actuating said mechanism, and means for varying the frequency of operation of said feeding mechanism without affecting the speed of the actuating mechanism.

2. The combination, with a rotary hearth oven for heat treating metal articles, of article feeding mechanism therefor, means for rotating the hearth of said oven, and means for operatively connecting said feeding mechanism with said hearth rotating means so as to be actuated thereby at predetermined intervals.

3. The combination, with a rotary hearth oven for heat treating metal articles, of article feeding mechanism therefor, means for rotating the hearth of said oven, means for operatively connecting said feeding mechanism with said hearth rotating means so as to be actuated thereby at predetermined intervals, and means for varying the frequency of operation of said feeding mechanism.

4. The combination with an oven for heat treating metal articles of article feeding and extracting mechanism therefor, means for intermittently actuating said mechanism, and means for varying the frequency of operation of said feeding and extracting mechanism without affecting the speed of the actuating mechanism.

5. The combination with a rotary hearth oven for heat treating metal articles of article feeding and extracting mechanism therefor, means for rotating the hearth of said furnace, and means for operatively connecting said feeding and extracting mechanism with said hearth rotating means so as to be actuated thereby at predetermined intervals.

6. The combination with a rotary hearth oven for heat treating metal articles of article feeding and extracting mechanism therefor, means for rotating the hearth of said furnace, means for operatively connecting said feeding and extracting mechanism with said hearth rotating means so as to be actuated thereby at predetermined intervals, and means for varying the frequency of operation of said feeding and extracting mechanism.

7. The combination with an oven for heat treating metal articles of a magazine adapted to receive articles to be heated, and automatic means for removing the articles from said magazine and depositing them in said oven at predetermined intervals.

8. The combination with an oven for heat treating metal articles of a magazine adapted to receive articles to be heated, means for automatically removing the articles from said magazine and depositing them in said oven at predetermined intervals, and means for controlling the rate at which said articles are removed from said magazine and deposited in said furnace.

9. The combination with an oven for heat treating metal articles of a magazine for receiving articles, automatic means for removing the articles from said magazine and for feeding said articles into said oven at predetermined intervals, and means operating in timed relation with said article removing and feeding means for extracting the articles from said oven, and means for controlling the rate at which said articles are fed into the oven and extracted therefrom.

10. The combination with a rotary hearth oven for heat treating metal articles of a magazine for receiving articles, means adapted to be operatively connected to the hearth driving means for removing the articles from said magazine and for feeding the same into said oven, and means for connecting the article removing and feeding means to said hearth driving means for feeding a predetermined number of articles into said furnace during each revolution of the hearth thereof.

11. The combination with a rotary hearth oven for heat treating metal articles of a magazine for receiving articles, mechanism for removing the articles from said magazine and for feeding the same into said oven, mechanism operating in timed relation to said article removing and feeding mechanism for extracting articles from said oven, and means controlled by the hearth driving means for automatically connecting said article removing and feeding mechanism and said article extracting mechanism to said hearth driving means so as to be actuated thereby at predetermined intervals, said connecting means being adjustable whereby the time interval between successive actuation of said removing and feeding mechanism and said extracting mechanism can be varied regardless of the speed of the hearth driving means.

12. The combination with a rotary hearth oven for heat treating metal articles having a receiving opening and an outlet opening and continuously moving means for rotating said hearth of a magazine for the articles, mechanism for removing the articles from said magazine and for feeding them into said oven through the receiving opening thereof, mechanism operatively connected to said removing and feeding mechanism for extracting the articles from said oven through the outlet opening thereof, and clutch means operated by the hearth driving means for intermittently connecting said removing and feeding mechanism and said extracting mechanism to said hearth driving means at predetermined intervals.

13. The combination with a rotary hearth oven for heat treating metal articles having a receiving opening of a feeding device comprising a supporting plate, a magazine for the articles mounted on said supporting plate, a movable carrier plate adapted to move into said oven through the receiving opening thereof, a movable loader arm for removing the articles from said magazine and depositing the same on said carrier plate, a movable stripper arm for removing the articles from said carrier plate and depositing them in said oven, and rotating cam devices operated by the hearth driving means for actuating said loader arm, said carrier plate and said stripper arm at proper time intervals in the order named.

14. The combination with a rotary hearth oven for heat treating metal articles having a receiving opening of a feeding device comprising a supporting plate, a magazine for the articles mounted on said supporting plate, means for adjusting said magazine to accommodate articles of different sizes, a movable carrier plate adapted to move into said oven through the receiving opening thereof, a movable loader arm for removing the articles from said magazine and depositing them on said carrier plate, a movable stripper arm for pushing the articles off said carrier plate onto the rotary hearth of said oven, said stripper arm being adjustable as to length, and cam devices operatively connected to the hearth driving means for actuating said loader arm, said carrier plate and said stripper arm at proper timed intervals in the order named.

15. The combination with a rotary hearth oven for heat treating metal articles having a receiving opening, an outlet opening and a means for rotating said hearth of a feeding and extracting device comprising a supporting plate, a magazine for receiving articles mounted on said supporting plate, a movable carrier plate adapted to move into said oven through the receiving opening thereof, a movable loader arm adapted to remove the article from said magazine and deposit the same on said carrier plate, a movable stripper arm adapted to engage the article on said carrier plate and push the same off said plate onto the rotary hearth of said oven, a movable extracting device for extracting the article from said furnace through the outlet opening thereof, and means operatively connected to said hearth driving means for actuating said loader arm, said carrier plate, said stripper arm and said extracting device at proper time intervals.

16. The combination with a rotary hearth oven for heat treating metal articles having a receiving opening, an outlet opening and a means for rotating said hearth of a feeding and extracting device comprising a supporting plate, a magazine for receiving articles mounted on said supporting plate, a movable carrier plate adapted to move into said oven through the receiving opening thereof, a movable loader arm adapted to remove the article from said magazine and deposit the same on said carrier plate, a movable stripper arm adapted to engage the article on said carrier plate and push the same off said plate onto the rotary hearth of said oven, a movable extractor rod for extracting said articles from said furnace through the outlet opening thereof when said articles arrive opposite said outlet opening, means for raising and lowering the extractor rod to engage and release the articles, means for adjusting the extractor rod to accommodate articles of different sizes, and means operatively connected to the hearth driving means for intermittently actuating said loader arm, said carrier arm, said stripper arm and said extractor rod at proper time intervals.

17. The combination with a rotary hearth oven for heat treating metal articles of an article feeding and extracting device therefor, drive gearing for continuously rotating the rotary hearth of said oven and for intermittently actuating said article feeding and extracting device, means for normally disengaging said feeding and extracting device from said drive gearing, and means controlled by said drive gearing for connecting said article feeding and extracting device to said drive gearing at predetermined intervals.

18. The combination with an oven for heat treating metal articles of article feeding and extracting mechanism therefor, drive gearing for actuating said feeding and extracting device, clutch means for connecting and disconnecting said drive gearing to said feeding and extracting device, a latch for normally holding said clutch means out of engagement of said feeding and extracting means, and means controlled and operated by said drive gearing for unlocking said latch and for operating said clutch means to connect said drive gearing with said feeding and extracting device.

19. The combination with a rotary hearth oven for heat treating metal articles of article feeding and extracting mechanism therefor, drive gearing for continuously rotating said rotary hearth and for actuating said feeding and extracting mechanism at predetermined intervals, clutch means for connecting and disconnecting said drive gearing to said feeding and extracting device, a latch for normally holding said clutch means out of engagement of said feeding and extracting means, and means controlled and operated by said drive gearing for unlocking said latch and for operating said clutch means to connect said drive gearing with said feeding and extracting device.

20. The combination with a rotary hearth oven for heat treating metal articles of feeding and extracting mechanism therefor, a rotary cam device for actuating said feeding and extracting mechanism, constantly driven gearing for driving said hearth, normally disengaged clutch means for connecting and disconnecting said drive gearing with said rotating cam devices, means operated by said feeding and extracting mechanism for disconnecting said clutch means, means for locking said clutch means in disconnected position, and means operated by said drive gearing for unlocking the clutch locking means and for connecting said clutch means with said drive gearing to rotate said cam devices.

21. The combination with a rotary hearth oven for heat treating metal articles of article feeding mechanism therefor, drive gearing for continuously rotating said rotary hearth, normally disengaged clutch means for connecting and disconnecting said drive gearing with said article feeding and extracting mechanism for actuating the same at predetermined intervals, said drive gearing comprising a continuously driven shaft having a pinion thereon for driving said rotary hearth, a rock-rod having a connection with said clutch means, and means operated by said drive shaft for rocking said rock arm to cause the drive gearing to be connected to said loading and extracting device a predetermined number of times during each revolution of said drive shaft.

22. The combination with a rotary hearth oven for heat treating metal articles of article feeding and extracting mechanism therefor, drive gearing for continuously rotating said rotary hearth, normally disengaged clutch means for connecting and disconnecting said drive gearing with said feeding and extracting mechanism, means controlled by the operation of said feeding and extracting mechanism for actuating said clutch means to disconnect said feeding and extracting mechanism and said drive gearing, a latch for locking said clutch means in its disengaged position, a rock-rod operatively connected to said clutch means and to the latch therefor, means operated by said drive gearing for actuating said rock-rod to unlock said latch and to actuate said clutch means to connect the drive gearing with said feeding and extracting mechanism a predetermined number of times during each revolution of said drive gearing, and means for varying the interval between each actuation of said rock-rod.

23. The combination with a rotary hearth oven for heat treating metal articles of a feeding and extracting mechanism therefor, drive gearing for continuously driving said rotary hearth and for intermittently operating said feeding and extracting mechanism, said driving gearing comprising a main drive shaft, a clutch drive shaft and a starting shaft, means for imparting a continuous rotary motion to said clutch drive shaft and to said starting shaft, a clutch device slidably mounted on said clutch drive shaft and adapted to be connected and disconnected with said feeding and extracting device for intermittently operating the same, a pinion shaft connected to said starting shaft by gearing, means for imparting rotary motion of said pinion shaft to said rotary hearth, a gear detachably secured to said pinion shaft, a removable gear loosely mounted on said starting shaft and meshing with the gear on said pinion shaft, and means operated by said loosely mounted gear for actuating said clutch device to connect the clutch drive shaft with said feeding and extracting mechanism a predetermined number of times during each revolution of said loosely mounted gear.

24. The combination with a rotary hearth oven for heat treating metal articles of a feeding and extracting mechanism therefor, means for continuously driving said rotary hearth and for intermittently actuating said feeding and extracting mechanism, said means comprising a main drive shaft, a clutch drive shaft and a starting shaft, means for imparting continuous rotary motion from said main shaft to said clutch drive shaft and said starting shaft, a normally disengaged clutch device slidably mounted on said clutch drive shaft and adapted to be intermittently connected and disconnected with said feeding and extracting mechanism for actuating the same, a pinion shaft connected to said starting shaft by gearing, means for imparting rotary motion from said pinion shaft to said rotary hearth, pairs of gears adapted to be removably secured to said starting shaft and said pinion shaft, one gear of a pair being adapted to be fixed to said pinion shaft so as to rotate therewith and the other gear being rotatably mounted on the starting shaft, and means operated by said gear on said starting shaft for actuating said clutch device to connect the clutch shaft to the feeding and extracting mechanism at predetermined intervals, said removable gears being of different sizes whereby the speed of the gear on said starting shaft can be varied to vary the frequency of operation of the clutch actuating means.

25. The combination with a rotary hearth oven for heat treating metal articles of a feeding and extracting mechanism therefor, means for continuously driving said rotary hearth and for intermittently actuating said feeding and extracting mechanism, said means comprising a main drive shaft, a clutch drive shaft and a starting shaft, changed speed mechanism for said starting shaft, means for imparting continuous rotary motion from said main shaft to said clutch drive shaft and said starting shaft, a normally disengaged clutch device slidably mounted on said clutch drive shaft and adapted to be intermittently connected and disconnected with said feeding and extracting mechanism for actuating the same, a pinion shaft connected to said starting shaft by gearing, means for imparting rotary motion from said pinion shaft to said rotary hearth, a gear detachably secured to said pinion shaft, a removable gear loosely mounted on said starting shaft and meshing with the gear on said pinion shaft, a starting disk secured to the gear loosely mounted on said sliding shaft, said starting disk having a variable number of projections thereon, and means engaged by said projections for actuating said clutch device to connect said clutch drive shaft with said feeding and extracting device at predetermined intervals.

26. The combination with a rotary hearth oven for heat treating metal articles of a feeding and extracting mechanism therefor, means for continuously driving said rotary hearth and for intermittently actuating said feeding and extracting mechanism, said means comprising a main drive shaft, a clutch drive shaft and a starting shaft, changed speed mechanism for said starting shaft, means for imparting continuous rotary motion from said main shaft to said clutch drive shaft and said starting shaft, a normally disengaged clutch device slidably mounted on said clutch drive shaft and adapted to be intermittently connected and disconnected with said feeding and extracting mechanism for actuating the same, a pinion shaft connected to said starting shaft by gearing, means for imparting rotary motion from said pinion shaft to said rotary hearth, a gear detachably secured to said pinion shaft, a removable gear loosely mounted on said starting shaft and meshing with the gear on said pinion shaft, a starting disk secured to the gear on said starting shaft so as to rotate therewith, said starting disk having a variable number of projections thereon, and a rock-rod operatively connected to said clutch device for actuating the same, said starting rod having a rock-arm adapted to be engaged by the projections on said starting disk whereby such engagement causes the rock-arm to actuate the clutch device and connect the clutch drive shaft to the feeding and extracting mechanism.

Signed at Canton, Ohio, this 17th day of March, 1920.

OSWALD SCHLAUPITZ.